(No Model.)

F. T. SMITH.
BOTTLE STOPPER.

No. 512,126. Patented Jan. 2, 1894.

WITNESSES:
John A. Rennie
C. Sedgwick

INVENTOR
F. T. Smith
BY Munn & Co.
ATTORNEYS.

UNITED STATES PATENT OFFICE.

FLOYD T. SMITH, OF NEW YORK, N. Y.

BOTTLE-STOPPER.

SPECIFICATION forming part of Letters Patent No. 512,126, dated January 2, 1894.

Application filed February 17, 1893. Serial No. 462,733. (No model.)

*To all whom it may concern:*

Be it known that I, FLOYD T. SMITH, of New York city, in the county and State of New York, have invented a new and useful Improvement in Bottle-Stoppers, of which the following is a full, clear, and exact description.

My invention relates to an improvement in bottle stoppers and it has for its object to provide a stopper of simple, durable and economic construction capable of being applied to the neck of any bottle and which when applied will effectually prevent, in the event the bottle is empty, a refilling of the bottle unless the stopper has been previously removed.

Another object of the invention is to provide a means whereby when the stopper is in position in the neck of the bottle, whatever fluid may be contained in the bottle may be readily poured out therefrom.

Another feature of the invention is to provide a means whereby the stopper will be held firmly in the bottle, and whereby also if it is removed the fact may be readily detected.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
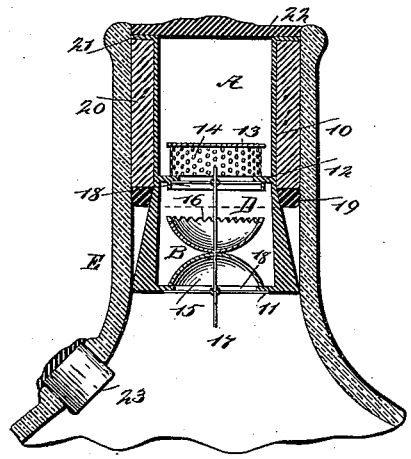
Figure 2:
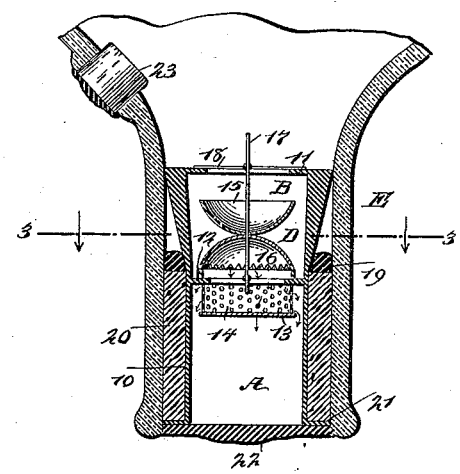
Figure 3:
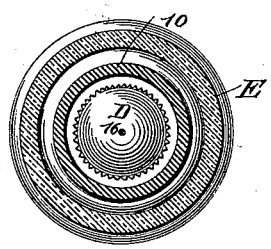

Figure 1 is a central vertical section through the neck of a bottle having the improved stopper applied thereto, illustrating the stopper as completely closing the mouth of the bottle. Fig. 2 is a similar section to Fig. 1, the neck of the bottle however to which the stopper is applied being shown in an inverted position and the stopper in position to admit of the discharge of liquid from the bottle to which it is applied. Fig. 3 is a horizontal section taken practically on the line 3—3 of Fig. 2; and Fig. 4 is a central vertical section through a stopper and the neck of a bottle, illustrating a modification in the form thereof.

In carrying out the invention the body of the stopper consists of a casing 10, preferably of circular construction in cross section, the said casing having preferably an outwardly-flaring beveled or conical lower end surface, as shown in Figs. 1 and 2, whereby the lower end of the casing is of greater exterior diameter than its upper end, and the casing may be made the full length of the neck of the bottle, or may be much shorter, as in practice may be found desirable. The inner surface of the casing, however, is ordinarily made of equal diameter throughout its length. The casing is open at top and bottom, and is provided at its lower end with an inwardly-extending horizontal annular flange 11, and a similar flange 12, is formed in the casing whereby the casing may be virtually said to be formed with two chambers, an upper chamber A and a lower chamber B.

Figure 4:
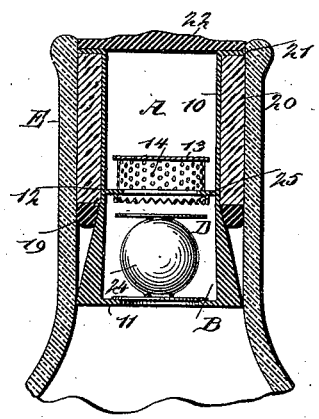

Within the upper chamber A a capped tube 13, is located, which rests upon the upper flange 12 and completely surrounds and covers the opening in said flange, the said capped tube being provided with a series of apertures or openings 14, as is best shown in Figs. 1, 2 and 4.

Within the lower chamber B of the casing a valve D, is held to slide, and this valve preferably consists of two semi-spherical bodies 15 and 16, which are placed with their convexed or cylindrical surfaces in contact. The semi-spherical bodies may be made either hollow or solid; ordinarily, however, they are hollow and both of the bodies are secured upon a stem 17, which is secured in spiders 18, or like supporting devices located within the openings surrounded by the flanges 11 and 12. Ordinarily the upper edge of the upper valve section is scalloped, toothed, roughened or apertured, so that when the said edge of the valve is seated upon the flange 12, or a ring or like device placed upon the flange liquid may flow from the chamber B into the chamber A.

It will be understood that the valve sections 15 and 16 are made of such diameter that they will properly seat themselves upon both the upper and lower flanges 11 and 12, and when so seated will cover the openings surrounded by said flanges; therefore, the diameter of the valve sections is less than the interior diameter of the casing, and liquid entering at the bottom of the casing and entering the chamber B, may readily pass into the chamber A when the valve bears against the flange 12.

Any approved material may be employed in the construction of the casing A; ordinarily, however, it is made of metal and the valve sections are preferably made of rubber. When the casing is inserted in the neck E of a bottle, its lower edge will engage with the inner face of the neck; and a gasket 19, of rubber, leather, or equivalent material is forced down over the top of the casing to an engagement with the inclined portion thereof and the inner wall of the bottle neck, thereby preventing the stopper from being withdrawn from the bottle, as when an attempt is made to withdraw the stopper it will become more firmly wedged by reason of the gasket 19, resting upon the inclined portion of the casing.

If in practice it is found desirable, the space between the neck of the bottle and the casing above the gasket 19 may be closed by a cork filling 20, or a filling of any desired construction; and a seal 21, is preferably secured upon the top of the cork or other filling 20 so that in the event an attempt is made to withdraw the casing the fact may be detected because of the marred appearance of the seal.

The mouth of the bottle may be temporarily closed by an ordinary stopper 22 or any equivalent thereof; and near the neck in one side of the bottle an opening may be made, normally closed by a cork or stopper 23, the said cork or stopper being covered or concealed by a seal or its equivalent. Thus when the bottle is returned to the parties authorized to fill it, the auxiliary stopper 23, may be removed and the bottle filled through the opening disclosed by such removal; and when the bottle has been filled the auxiliary stopper 23, may again be placed in the side opening and the outer face of the cork covered by a seal of any description.

In the operation of the device, when the bottle is in an upright position the lower section 15 of the valve D will rest upon the lower flange 11 and cover the opening therein, thus preventing the liquid that may be poured in at the top of the stopper passing into the bottle; and furthermore, the apertured capped tube 14, will prevent any person tampering with the valve by means of a wire or like article.

When it is desired to pour liquid from the bottle, when the bottle is inverted as shown in Fig. 2, the upper section of the valve will drop to a bearing against the upper flange 12, while the lower section of the valve will uncover the opening in the lower flange, and the liquid will pass through the bottom of the stopper around the valve D through the openings formed by the serrations in the upper valve section 16 and thence into the apertured capped tube, from whence it will find an exit, and likewise a ready exit from the bottle.

It will be observed that a stopper of the above description is exceedingly economic, it is durable and practical, and may be applied to any form of bottle.

In Fig. 4 I have illustrated a slight modification with reference to the valve; and the valve D in this instance consists of a ball 24. The said ball is provided with a plate at top and bottom, the upper plate being adapted to engage with a serrated or scalloped collar 25, projected downward from beneath the upper flange 12, while, a lower plate attached to the lower end of the ball may be utilized to close the opening in the lower flange 11; but if in practice it is found desirable the lower and likewise the upper plate on the ball may be removed, and the ball made solid or hollow as in practice may be found most desirable. Furthermore, instead of scallops or serrations being produced upon the upper valve section that portion of the valve may be plain and the scallops or serrations may be formed upon the upper flange 12.

Having thus described my invention, I claim as new and desire to secure by Letters Patent—

1. A bottle stopper, comprising a casing having an outwardly flaring lower end and provided with inwardly extending annular flanges one above the other, the upper flange having a collar projecting from its under surface a valve having two faces and arranged in the casing between the flanges, said valve being adapted to alternately engage the lower flange and the collar of the upper flange, and a capped and perforated tube on the upper flange, substantially as described.

2. In a bottle stopper, the combination with a casing having inwardly extending annular flanges one above the other, of a valve formed of two semi-spherical sections arranged with their convex surfaces in contact and secured to a valve stem fitted to slide in supports fitted in the openings surrounded by the said flanges, the upper valve section being scalloped, substantially as described.

3. In a bottle stopper, the combination with a casing having inwardly extending annular flanges one above the other, of a valve formed of two semi-spherical sections arranged with their convex surfaces in contact and secured to a stem sliding in supports in the openings surrounded by said flanges, the upper valve section being scalloped, and a capped and perforated tube on the upper flange, substantially as described.

4. In a bottle stopper, the combination, with the neck of a bottle, a casing fitted therein, the lower portion of the casing being conical, the said casing being also provided with an inlet and an outlet opening, and a gasket engaging with its beveled outer face and the neck of the bottle, of a perforated cap located above the outlet opening, and a valve having free movement to and from the inlet and outlet openings, the said valve being provided with two faces, the upper or outer face of the valve having teeth or serrations formed therein, as and for the purpose set forth.

FLOYD T. SMITH.

Witnesses:
 E. T. TAGGARD,
 W. C. ROGERS.